(12) United States Patent
Smith (10) Patent No.: US 10,814,412 B1
(45) Date of Patent: Oct. 27, 2020

(54) BLADE INSERT EXTENSION ASSEMBLIES (71) Applicant: Paul M. Smith, Garrison, TX (US)

(72) Inventor: Paul M. Smith, Garrison, TX (US)

(*) Notice: Subject to any disclaimer, the term of this patent is extended or adjusted under 35 U.S.C. 154(b) by 0 days.

(21) Appl. No.: 16/438,705

(22) Filed: Jun. 12, 2019

(51) Int. Cl.
*B27G 13/04* (2006.01)
*B23D 61/06* (2006.01)
*B27L 11/00* (2006.01)

(52) U.S. Cl.
CPC ........... *B23D 61/065* (2013.01); *B27G 13/04* (2013.01); *B27L 11/005* (2013.01)

(58) Field of Classification Search
CPC ...... B23D 61/065; B27G 13/02; B27G 13/04; B27G 13/08; B27G 13/10; B27L 11/00; B27L 11/005; B27L 11/02; B27L 11/04; B02C 18/18
See application file for complete search history.

(56) References Cited

U.S. PATENT DOCUMENTS

| 2,623,272 | A | 12/1952 | Greenleaf |
| 5,080,153 | A | 1/1992 | Waterman |
| 5,439,039 | A | 8/1995 | Bradstreet, Jr. et al. |
| 6,662,837 | B2 | 12/2003 | Smith |
| 7,182,112 | B2* | 2/2007 | Meados ............ B27C 1/02 144/117.1 |
| 7,703,713 | B2 | 4/2010 | Smith |
| 2007/0158478 | A1* | 7/2007 | Stager ............ B27L 11/005 241/91 |
| 2009/0200411 | A1* | 8/2009 | Stager ............ B27L 11/005 241/296 |

* cited by examiner

*Primary Examiner* — Matthew Katcoff
(74) *Attorney, Agent, or Firm* — R. Keith Harrison

(57) ABSTRACT

Blade insert extension assemblies may include a blade insert configured for placement in the insert seat of the adjustable blade. The blade insert may have a leading insert surface and a trailing insert surface. An insert extension assembly may be carried by the blade insert. The insert extension assembly may include at least one extension block disposed generally along at least a portion of the trailing insert surface.

19 Claims, 8 Drawing Sheets

BLADE INSERT EXTENSION ASSEMBLIES

FIELD

Illustrative embodiments of the disclosure generally relate to wood cutters and chippers. More particularly, illustrative embodiments of the disclosure relate to blade insert extension assemblies for extending the length of a blade insert in an adjustable blade on a chipping head.

SUMMARY

Illustrative embodiments of the disclosure are generally directed to blade insert extension assemblies for extending the length of a blade insert in an adjustable blade on a chipping head. An illustrative embodiment of the blade insert extension assemblies may include a blade insert configured for placement in the insert seat of the adjustable blade. The blade insert may have a leading insert surface and a trailing insert surface. An insert extension assembly may be carried by the blade insert. The insert extension assembly may include at least one extension block disposed generally along at least a portion of the trailing insert surface.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
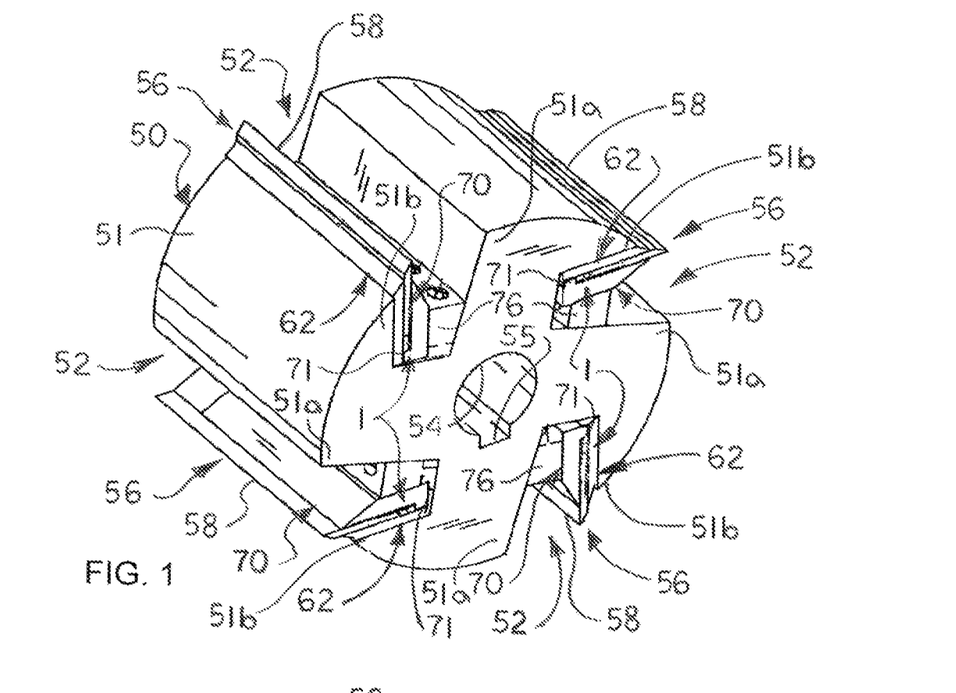
FIG. 1 is perspective view of a typical assembled chipping head with multiple blade insert extension assemblies provided on respective adjustable blades on the chipping head in typical application of the blade insert extension assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front". "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-4 of the drawings, an illustrative embodiment of the blade insert extension assemblies is generally indicated by reference numeral 1. The blade insert extension assemblies 1 may be configured to extend the length of a blade insert 2 in an adjustable blade 56 on a chipping head 50. In some applications, the chipping head 50 may be of the type which is provided in a brush chipper system (not illustrated). The chipping head 50 may include a generally cylindrical rotor head 51. Multiple blade mount channels 52 may extend into the rotor head 51 typically in parallel, spaced-apart relationship to each other around the circumference of the rotor head 51. A rotor head body 51*a* and a rotor head arm 51*b* may extend along respective sides of each blade mount channel 52. A central drive shaft bore 54 may traverse the rotor head 51. The drive shaft bore 54 may include a key slot 55 for drivingly coupling the rotor head 51 to a rotor head drive shaft (not illustrated).

Figure 2:
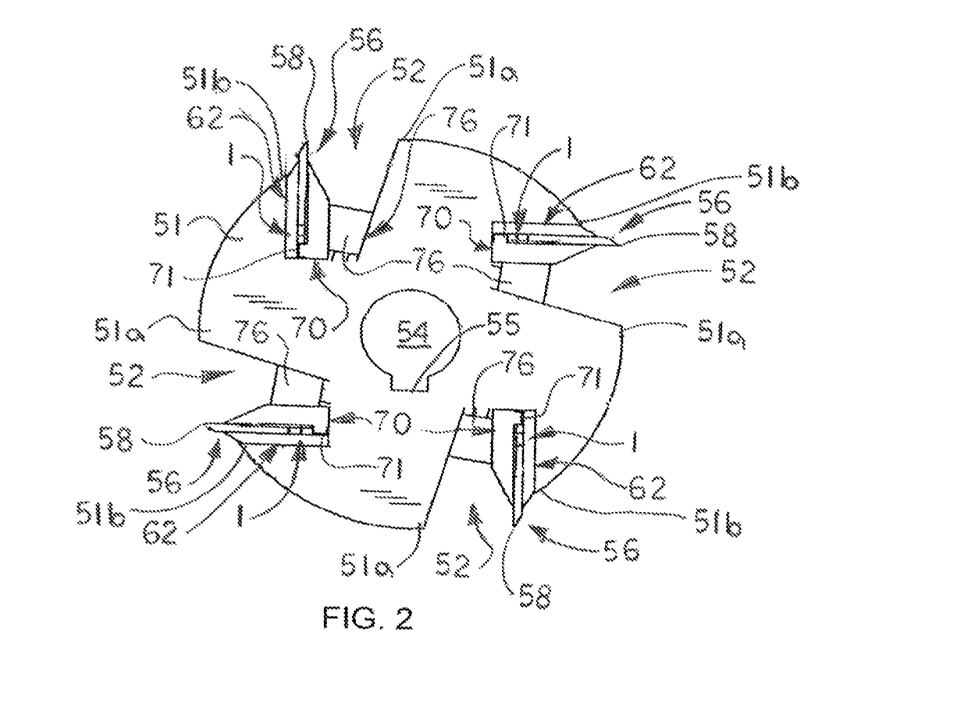
FIG. 2 is an end view of the assembled chipping head with adjustable blades and blade insert extension assemblies illustrated in FIG. 1.
Figures 3, 4:
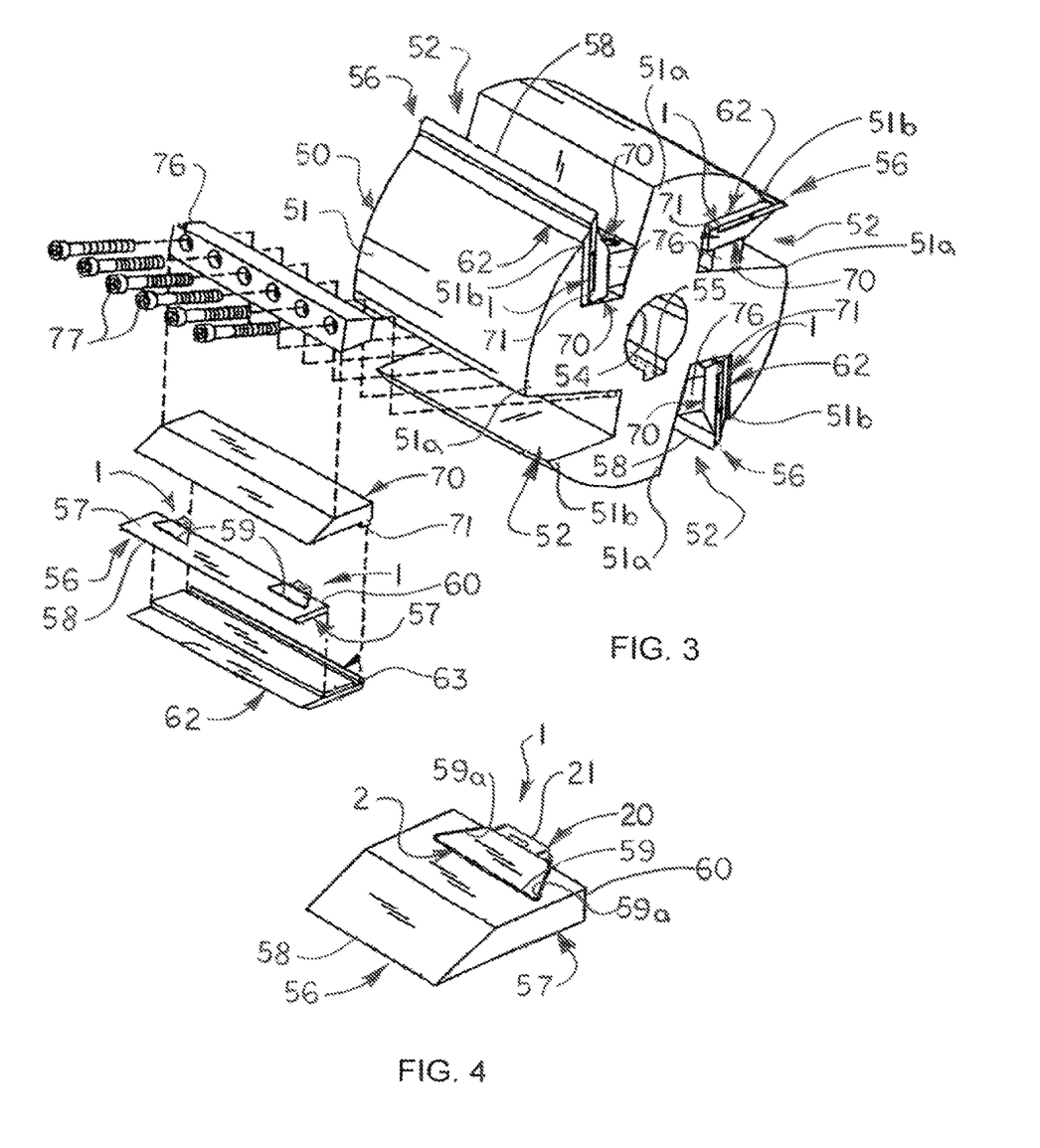
FIG. 3 is an exploded perspective view illustrating typical assembly of the blade insert extension assemblies with the adjustable blades in the chipping head.
FIG. 4 is a front perspective view of an illustrative assembled blade insert extension assembly seated in an insert seat provided in the adjustable blade.

As illustrated in FIGS. 2 and 3, each adjustable blade 56 may be sandwiched between a blade mount base 62 and a clamp plate 70 in each corresponding blade mount channel 52. An elongated blade wedge 76 may extend between the clamp plate 70 and the corresponding rotor head body 51a of the rotor head 51. As illustrated in FIG. 3, the blade wedge 76 may be attached to the interior surface of the blade mount channel 52 using multiple blade wedge fasteners 77. The blade mount base 62 may abut against the interior surface of the blade mount channel 52 at the rotor head arm 51b.

As illustrated in FIG. 3, an elongated clamp plate flange 71 may extend along the length of the clamp plate 70. An elongated blade mount base flange 63 may extend along the length of the blade mount base 62. Each adjustable blade 56 may be situated against the clamp plate flange 71 of the clamp plate 70 and the blade mount base flange 63 of the blade mount base 62.

As illustrated in FIG. 4, each adjustable blade 56 may include a blade body 57 having a trailing blade surface 60. A blade edge 58 may bevel or taper from the blade body 57 opposite the trailing blade surface 60. At least one insert seat 59 may extend into the trailing blade surface 60 of the blade body 57. Each insert seat 59 may have a pair of spaced-apart insert bevels 59a. The blade insert 2 of the blade insert extension assembly 1 may be suitably sized and configured to fit in the insert seat 59 in the adjustable blade 56. The blade insert extension assembly 1 may facilitate lengthwise extension of the blade insert 2 to correspondingly extend the blade edge 58 of the adjustable blade 56 a selected cutting distance 66 (FIG. 7) beyond the rotor body arm 51b of the rotor head 51 for purposes which will be hereinafter described.

Referring next to FIGS. 5-17 of the drawings, the blade insert 2 of the blade insert extension assembly 1 may be generally elongated and trapezoid-shaped. Accordingly, the blade insert 2 may have a leading insert surface 3. A trailing insert surface 4 may extend in parallel, spaced-apart relationship to the leading insert surface 3. The trailing insert surface 4 may have a length which is less than that of the leading insert surface 3. At least one, and typically, a pair of side insert surfaces 5 may angle toward each other from the leading insert surface 3 to the trailing insert surface 4. When the blade insert 2 is seated in the insert seat 59 (FIG. 4) of the blade body 57, the trailing insert surface 4 may be substantially flush with the trailing blade surface 60 of the blade body 57. As used herein, "leading insert surface" refers to the surface of the blade insert 2 which leads and "trailing insert surface" refers to the surface of the blade insert 2 which trails during rotation of the chipping head 50.

The blade insert 2 may include an inner insert surface 6 and an outer insert surface 7 which extend in parallel, spaced-apart relationship to each other. Each of the inner insert surface 6 and the outer insert surface 7 may be planar. The inner insert surface 6 and the outer insert surface 7 may be bounded by the leading insert surface 3, the trailing insert surface 4 and the side insert surfaces 5.

An insert extension assembly 20 may be provided on the blade insert 2. The insert extension assembly 20 may include at least one extension block 21 which may be disposed generally along at least a portion of the trailing insert surface 4 of the blade insert 2. In some embodiments, the extension block 21 may be selectively extendable from the trailing insert surface 4 of the blade insert 2 according to the knowledge of those skilled in the art, typically in a manner which will be hereinafter described. As used herein, the phrase "at least one extension block 21 disposed generally along at least a portion of the trailing insert surface 4" includes but is not limited to at least one extension block 21 which abuts against or engages the trailing insert surface 4 and/or is selectively deployable from or in spaced-apart relationship with respect to the trailing insert surface 4.

Figure 10:
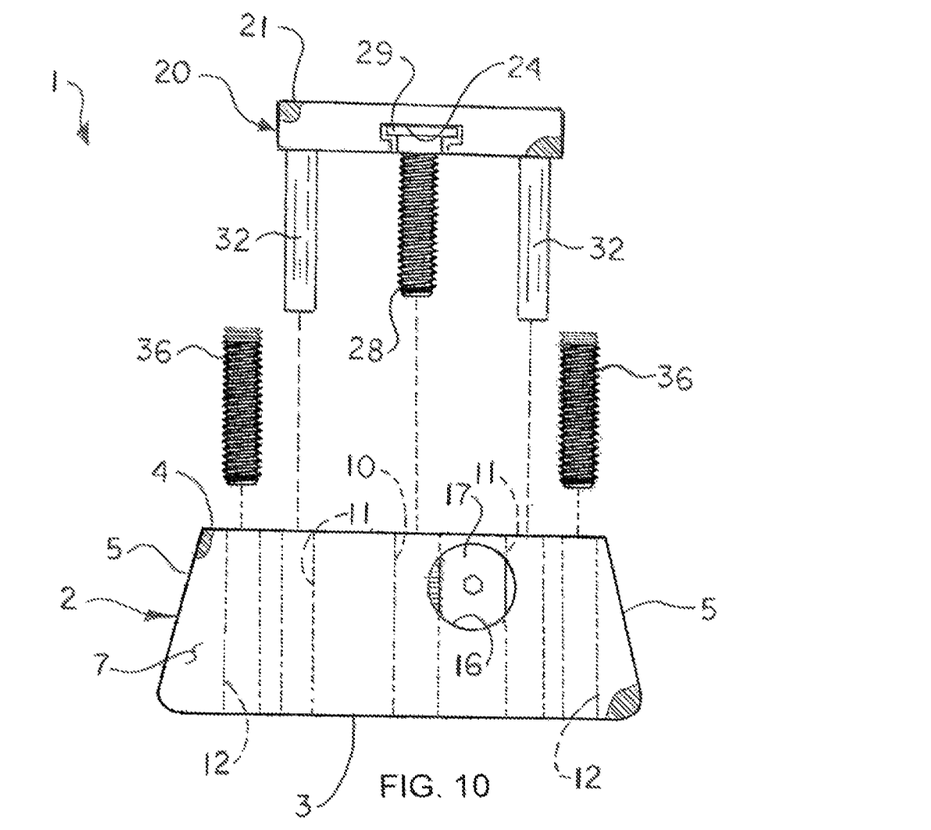
FIG. 10 is an exploded top view of the illustrative disassembled blade insert extension assembly.
Figure 11:
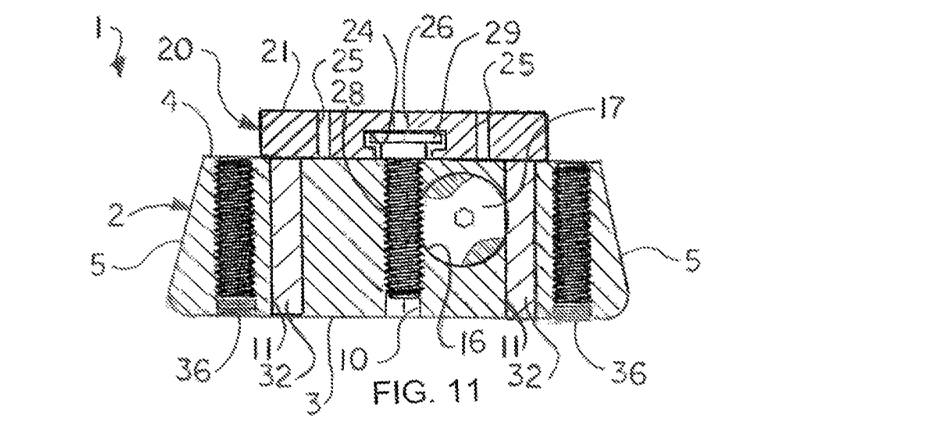
FIG. 11 is a planar sectional view of the illustrative assembled blade insert extension assembly.
Figure 12:
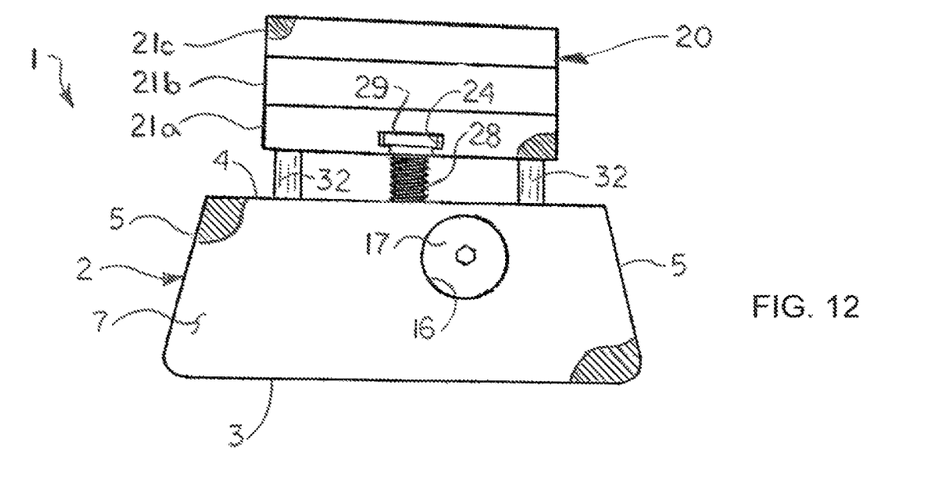
FIG. 12 is a top view of the illustrative assembled blade insert extension assembly with multiple extension blocks assembled in place on the assembly in typical application of the blade insert extension assemblies.

The extension block 21 may be selectively deployable rearwardly from or in spaced-apart relationship with respect to the trailing insert surface 4 of the blade insert 2 using any technique which is suitable for the purpose. In some embodiments, at least one, and typically, a pair of spaced-apart guide pin openings 11 may be provided in the blade insert 2. As illustrated in FIGS. 10 and 11, each guide pin opening 11 may extend between and open to the leading insert surface 3 and the trailing insert surface 4 of the blade insert 2 between the inner insert surface 6 and the outer insert surface 7. At least one block guide pin 32 may extend from the extension block 21. The block guide pin 32 may be selectively extendable from each corresponding guide pin opening 1 beyond the trailing insert surface 4. Accordingly, the extension block 21 may be selectively extendable between a retracted position, illustrated in FIGS. 5 and 8, in which the extension block 21 abuts, engages or is disposed adjacent or in proximity to the trailing insert surface 4, and a fully extended position, illustrated in FIG. 16, in which the extension block 21 is deployed in spaced-apart relationship to the trailing insert surface 4. The extension block 21 may be deployed to a selected position between the retracted and fully extended positions to correspondingly extend the adjustable blade 56 to the selected cutting distance 66 (FIG. 7) beyond the rotor head body 51b.

In some embodiments, at least one interiorly threaded adjusting screw opening 12 may extend between and open to the leading insert surface 3 and the trailing insert surface 4 of the blade insert 2 between the inner insert surface 6 and the outer insert surface 7. Typically, a pair of adjusting screw openings 12 may extend through the blade insert 2 inside and adjacent to the respective side insert surfaces 5 of the blade insert 2. An adjusting screw 36, which may be a hex screw in some embodiments, may be threaded in each adjusting screw opening 12 for purposes which will be hereinafter described.

At least one interiorly threaded block screw opening 10 may be provided in the blade insert 2 and open to the trailing insert surface 4. In some embodiments, the block screw opening 10 may extend between and parallel to the guide pin openings 11, as illustrated. At least one block screw 28 may extend from the extension block 21 typically between the block guide pins 32. The block screw 28 may thread into the block screw opening 10 as the block guide pins 32 insert into the respective guide pin openings 11. In some embodiments, the block screw 28 may be a hex screw.

Figure 6:
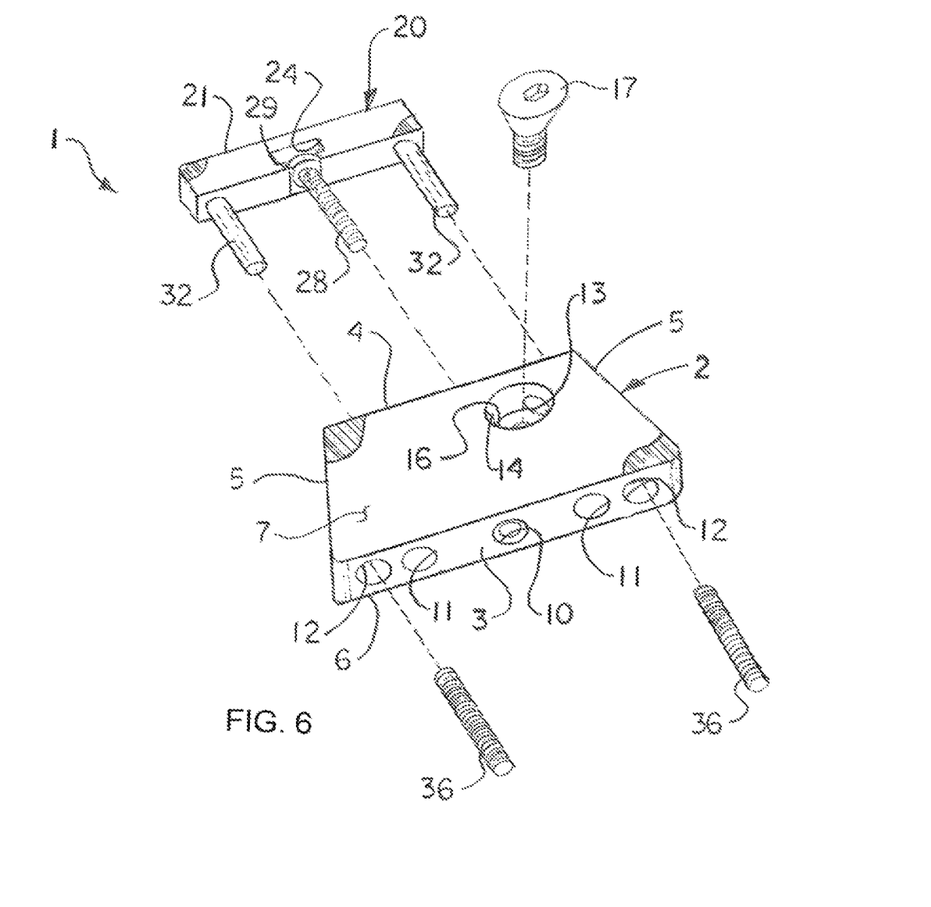
FIG. 6 is an exploded front perspective view of an illustrative disassembled blade insert extension assembly.
Figure 9:
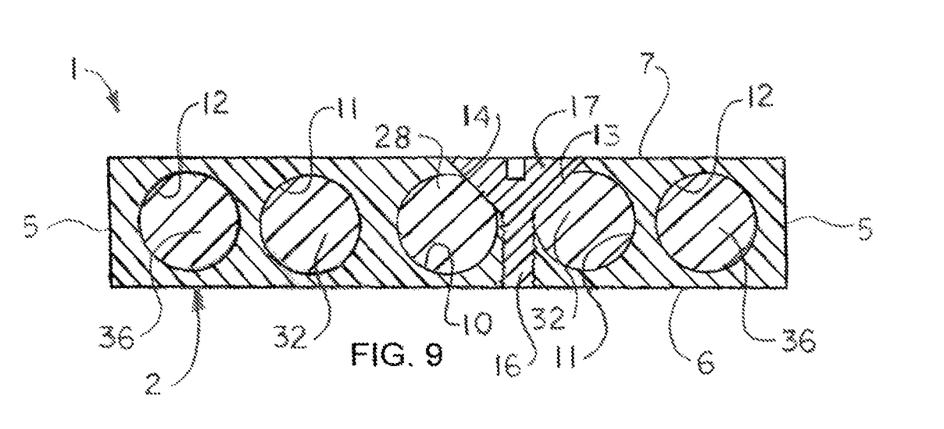
FIG. 9 is a longitudinal cross-sectional view, taken along section lines 9-9 in FIG. 8, of the illustrative assembled blade insert extension assembly.

As illustrated in FIGS. 6 and 9, in some embodiments, at least one tightening screw opening 16 may be provided in the blade insert 2. At least a portion of the tightening screw opening 16 may be interiorly threaded. As illustrated in FIG. 9, the tightening screw opening 16 may extend through the thickness of the blade insert 2 from the outer insert surface 7 to the inner insert surface 6. At least one of the guide pin openings 11 may partially intersect the tightening screw opening 16 at a guide pin tightening opening 13 such that the block guide pin 32 extends across the outer portion or rim of the tightening screw opening 16 at the guide pin tightening opening 13. Additionally or alternatively, the block screw opening 10 may partially intersect the tightening screw opening 16 at a block screw tightening opening 14 such that the block screw 28 extends across the opposite outer portion or rim of the tightening screw opening 16 at the block screw tightening opening 14. A tightening screw 17, which may be a hex screw in some embodiments, may be threaded in the tightening screw opening 16. Accordingly, the tightening screw 17 may be tightened against the block guide pin 32 and/or the block screw 28 to secure the extension block 21 against or at a selected spacing distance from the trailing insert surface 4 of the blade insert 2.

The block screw 28 may be mounted in rotatable relationship with respect to the extension block 21 using any technique which is suitable for the purpose. In some embodiments, the block screw 28 may have a block screw head 29. A block screw head cavity 24 may be provided in the extension block 21. The block screw head 29 may be rotatably disposed within the block screw head cavity 24. As illustrated in FIG. 11, a block screw head opening 26 may extend through the extension block 21 in communication with the block screw head cavity 24. Accordingly, the block screw 28 may be threaded into or from the block screw opening 10 by inserting a hex key (not illustrated) through the block screw head opening 26 into engagement with the block screw head 29 and rotating the block screw 28 using the hex key. The spacing distance between the extension block 21 and the trailing insert surface 4 of the blade insert 2 may be selected by accordingly threading the block screw 28 in the clockwise or counterclockwise direction in the block screw opening 10.

As illustrated in FIGS. 12-14 and 17, in some embodiments, the insert extension assembly 20 may include multiple extension blocks 21a, b, c. Accordingly, the block guide pins 32 may extend from a base extension block 21a. At least one middle extension block 21b may be attached to the base extension block 21a. A terminal extension block 21c may be attached to the middle extension block 21b. A selected number of the middle extension blocks 21b may be provided between the base extension block 21a and the terminal extension block 21c depending on the desired length of the blade insert 2, and hence, the desired cutting distance 66 of the blade edge 58 on the adjustable blade 56 beyond the rotor head arm 51b on the rotor head 51 of the chipping head 50.

Figure 13:
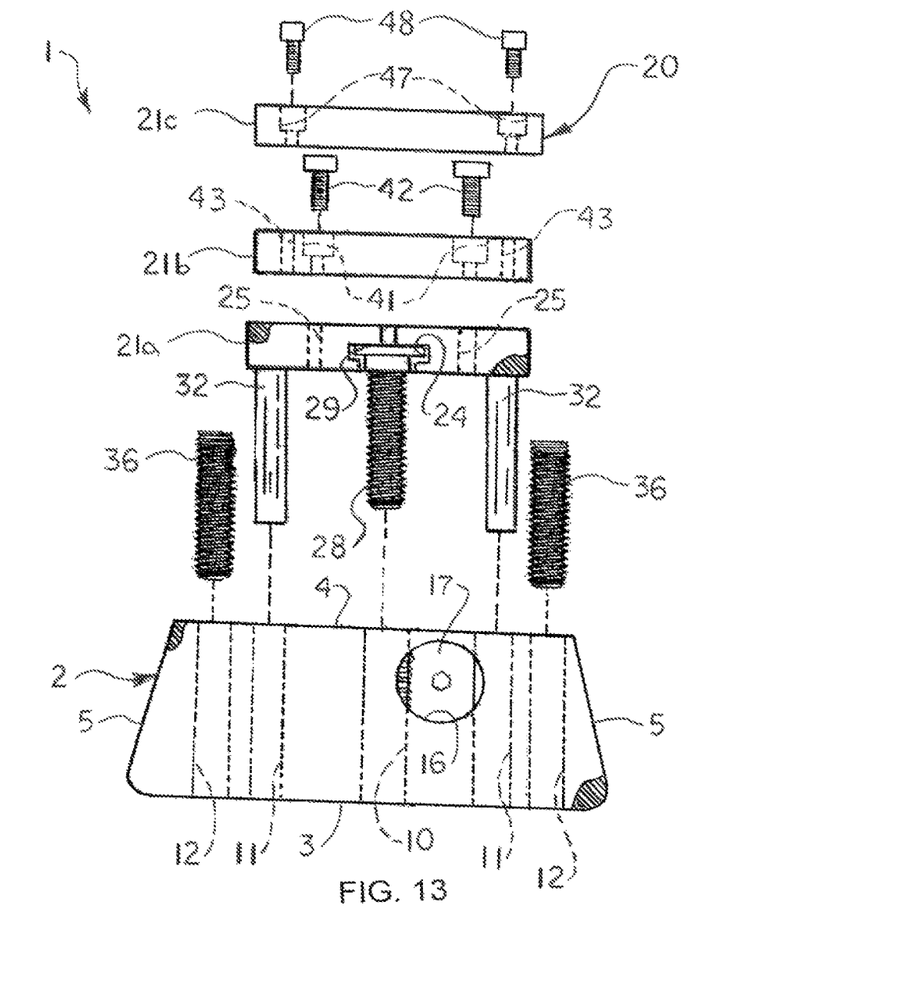
FIG. 13 is an exploded top view of the illustrative disassembled blade insert extension assembly illustrated in FIG. 12.
Figure 14:
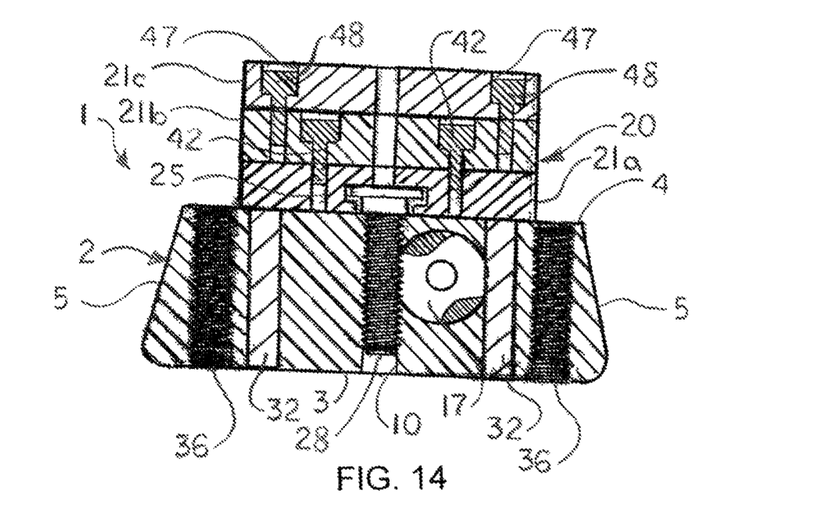
FIG. 14 is a planar sectional view of the illustrative assembled blade insert extension assembly illustrated in FIG. 12.
Figure 15:
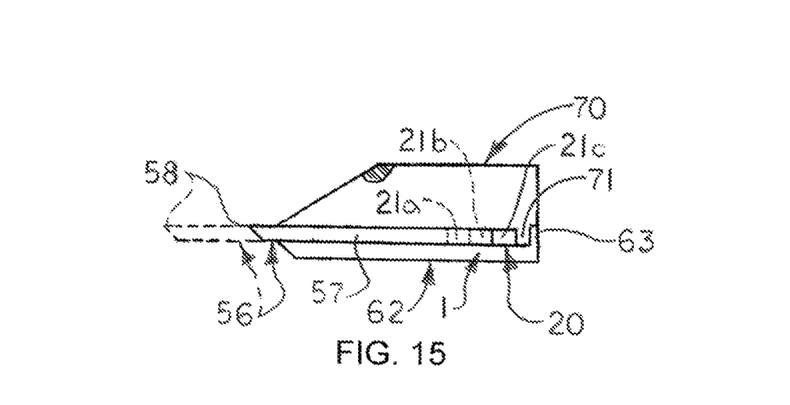
FIG. 15 is a side view of a typical adjustable blade sandwiched between a blade mount base and a clamp plate, with the illustrative blade insert extension assembly illustrated in FIG. 12 deployed in a retracted position (in solid lines) and an extended position (in phantom lines) to extend the adjustable blade at a selected extension distance with respect to the blade mount base and the clamp plate in typical application of the blade insert extension assemblies.
Figure 16:
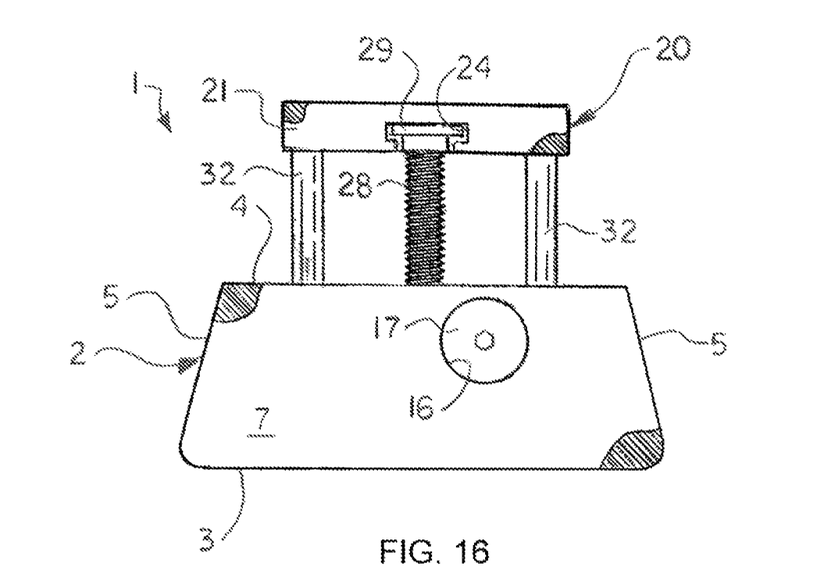
FIG. 16 is a top view of the illustrative assembled blade insert extension assembly with the insert extension assembly deployed in a fully extended position.
Figure 17:
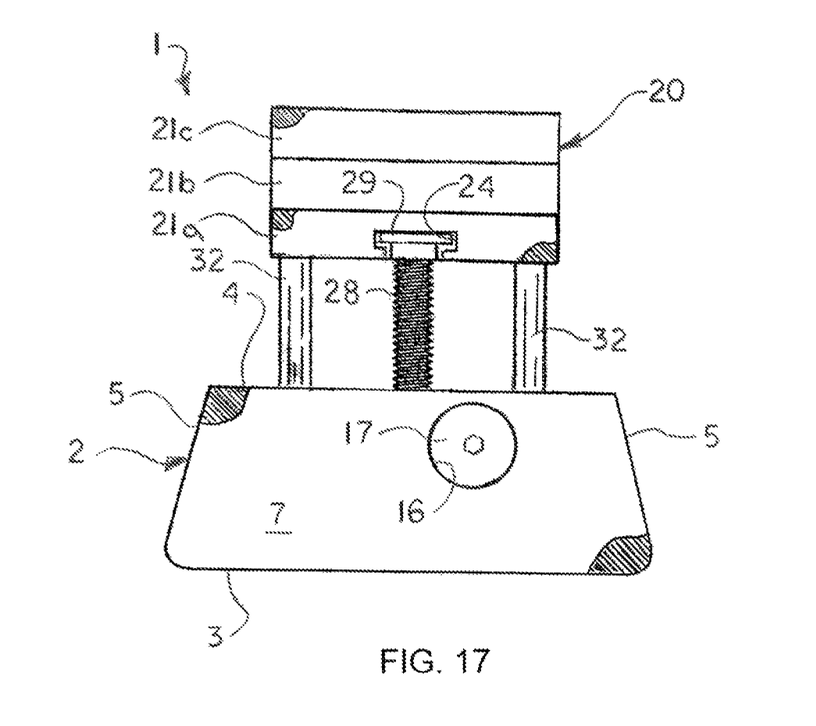
FIG. 17 is a top view of the illustrative assembled blade insert extension assembly with the insert extension assembly deployed in a fully extended position and having multiple extension blocks.

The middle extension block 21b may be attached to the base extension block 21a and the terminal extension block 21c to the middle extension block 21b using any technique which is suitable for the purpose. As illustrated in FIGS. 13 and 14, in some embodiments, a pair of interiorly threaded, spaced-apart base block openings 25 may extend through the base extension block 21a typically on opposite sides of the block screw head cavity 24. A pair of spaced-apart middle block fastener openings 41 may extend through the middle extension block 21b in registering relationship to the respective base block openings 25. A pair of middle block fasteners 42 may be seated in the respective middle block fastener openings 41 and threaded into the respective registering base block openings 25 to attach the middle extension block 21b to the base extension block 21a.

A pair of interiorly threaded, spaced-apart middle block openings 43 may extend through the middle extension block 21b typically on opposite sides of the respective middle block fastener openings 41. A pair of spaced-apart terminal block fastener openings 47 may extend through the terminal extension block 21c in registering relationship to the respective middle block openings 43. A pair of terminal block fasteners 48 may be seated in the respective terminal block fastener openings 47 and threaded into the respective registering middle block openings 43 to attach the terminal extension block 21c to the middle extension block 21b.

Figure 5:
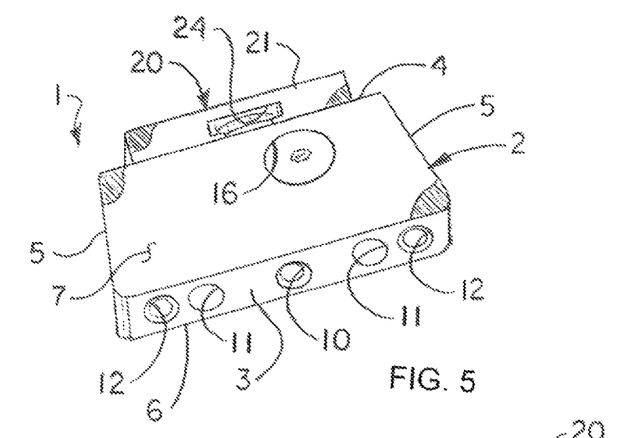
FIG. 5 is a front perspective view of an illustrative assembled blade insert extension assembly.

Referring next to FIGS. 1-7 of the drawings, in typical application, at least one blade insert extension assembly 1 may be assembled on each adjustable blade 56 which is to be placed in the chipping head 50. Accordingly, the insert extension assembly 20 of each blade insert extension assembly 1 may initially be assembled on each blade insert 2, as illustrated in FIGS. 5 and 6. The length of the insert extension assembly 20 may be selected by extending or retracting the extension block 21 relative to the trailing insert surface 4 of the blade insert 2, typically as was heretofore described with respect to FIGS. 7 and 8, and/or by attaching the middle extension block or blocks 21b and/or the terminal extension block 21c to the base extension block 21a, typically as was heretofore described with respect to FIGS. 12-15 and 17. The selected length of the insert extension assembly 20 may correspond to the desired cutting distance 66 (FIG. 7) of the blade edge 58 of the adjustable blade 56 beyond the rotor body arm 51b of the rotor head 51, depending typically on the length of the blade body 57 of the adjustable blade 56. The cutting distance 66 of the blade edge 58 may depend on the desired cutting characteristics of the chipping head 50 and may be adjusted throughout use of the chipping head 50 to compensate for removal of blade metal from the blade body 57 as the blade edge 58 of the adjustable blade 56 is periodically sharpened.

As illustrated in FIG. 4, the blade insert 2 may be inserted in the insert seat 59 in the adjustable blade 56. The adjusting screws 36 (FIG. 6) may be threaded in the respective adjusting screw openings 12 in the blade insert 2 beyond the leading insert surface 3 to engage the leading surface of the insert seat 59 and wedge the side insert surfaces 5 of the blade insert 2 against the respective insert bevels 59a in the insert seat 59.

Figure 7:
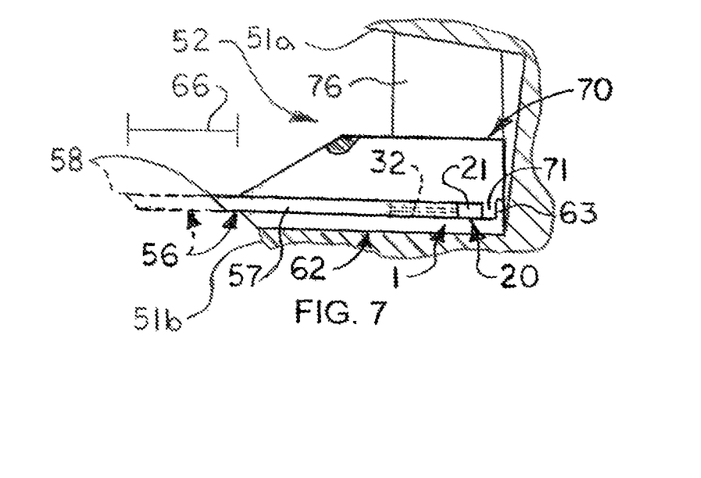
FIG. 7 is a side view of a typical adjustable blade sandwiched between a blade mount base and a clamp plate, with an illustrative blade insert extension assembly in the adjustable blade deployed in a retracted position (in solid lines) and an extended position (in phantom lines) to extend the adjustable blade at a selected extension distance with respect to the blade mount base and the clamp plate in typical application of the blade insert extension assemblies.
Figure 8:
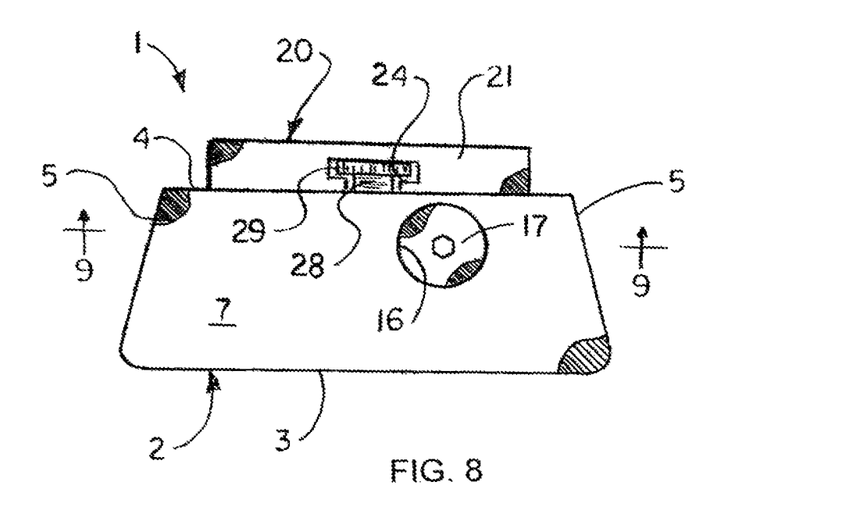
FIG. 8 is a top view of an illustrative assembled blade insert extension assembly.

Each adjustable blade 56 may be assembled on the chipping head 50 typically by initially placing the blade body 57 between the blade mount base 62 and the clamp plate 70. The blade mount base 62, adjustable blade 56 and clamp plate 70 may then be placed in the corresponding blade mount channel 52 with the blade mount base 62 typically engaging the interior surface of the rotor head arm 51b, as illustrated in FIG. 7. The blade wedge 76 may then be inserted or wedged in place between the clamp plate 70 and interior surface of the rotor head body 51a and secured to the rotor head 51 typically using the blade wedge fasteners 77, as was heretofore described with respect to FIG. 3. As further illustrated in FIG. 7, the extension block 21 of the insert extension assembly 20 typically engages the interior surface of the blade mount channel 52 between the rotor head body 51a and the rotor head arm 51b to protrude or extend the adjustable blade 56 at the desired cutting distance 66 beyond the rotor head arm 51b.

As the chipping head 50 is rotated under power applied to the rotor head drive shaft (not illustrated) typically in the clockwise direction illustrated in FIG. 2, the blade edges 58 of the respective adjustable blades 56 may alternately and repeatedly contact sticks, limbs or brush (not illustrated) fed into the brush chipper and reduce the sticks, limbs or brush to wood bits and chips in the conventional manner. Periodic removal of the blade body 57 of each adjustable blade 56 from the chipping head 50 may be facilitated as needed for sharpening or, in the case of extreme wear, replacement typically by unthreading the wedge mount bolts 77, removing the wedge 76 from the blade mount channel 52, and removing the blade body 57 from between the now loosened blade mount base 62 and clamp plate 70. The metal which is lost during the sharpening of the blade edge 58 of each blade body 57 may be determined by measuring the resulting length of the shortened blade body 57. In some embodiments, the length of the insert extension assembly 20 may be adjusted to a distance which is equal to the lost metal dimension to achieve or maintain the desired cutting distance 66 of the blade edge 58 beyond the blade edge 58 of the adjustable blade 56, as illustrated in FIG. 7. Additionally or alternatively, each of the adjusting screws 36 may be threadably withdrawn from the respective adjusting screw openings 12 in the blade insert 2 a distance which is equal to the lost metal dimension.

It will be appreciated by those skilled in the art that the blade insert extension assemblies 1 of the disclosure facilitate a significant savings in costs associated with operating various types of wood cutters and chippers. This savings is realized by enabling each adjustable blade 56 to be sharpened and reused many times and quickly and easily refitted to the rotor head 51 by manipulating and/or assembling the length of the insert extension assembly 20 and/or unthreading the adjusting screws 36 from the respective adjusting screw openings 12 to compensate for the material lost in re-sharpening of the cutting edge 58 on the blade body 57 of each adjusting blade 56. The blade insert extension assemblies 1 are capable of use on adjustable blades 56 for a variety of wood cutters and chippers of various design, including but not limited to log slabbers, canters, brush chippers and chips-n-saws, in non-exclusive particular. The various components of the blade insert extension assemblies 1 may be fabricated of steel, aluminum, other metals, polymeric materials, composite materials or any combination thereof using conventional casting, molding, milling, machining and other fabrication techniques known by those skilled in the art.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A blade insert extension assembly for an adjustable blade having an insert seat, the adjustable blade suitable for deployment in a blade mount channel of a chipping head and comprising:
    a blade insert configured for placement in the insert seat of the adjustable blade, the blade insert having a leading insert surface, a trailing insert surface, a planar inner insert surface and a planar outer insert surface;
    an insert extension assembly carried by the blade insert, the insert extension assembly including at least one extension block disposed generally along at least a portion of the trailing insert surface, the at least one extension block having a plane disposed within or at least partially coinciding with a plane of the blade insert, the at least one extension block configured to facilitate lengthwise or planar extension of the blade insert to correspondingly extend the adjustable blade a selected cutting distance beyond the chipping head; and
    wherein the at least one extension block of the insert extension assembly is selectively extendable from the trailing insert surface of the blade insert from a retracted position in which the extension block abuts, engages or is disposed adjacent to the trailing insert surface and a fully extended position in which the extension block is deployed in spaced-apart relationship to the trailing insert surface.

2. The blade insert extension assembly of claim 1 further comprising at least one block screw opening in the blade insert and at least one block screw extending from the at least one extension block and threaded in the at least one block screw opening.

3. A blade insert extension assembly for an adjustable blade having an insert seat, comprising:
    a blade insert configured for placement in the insert seat of the adjustable blade, the blade insert having a leading insert surface and a trailing insert surface;
    an insert extension assembly carried by the blade insert, the insert extension assembly including at least one extension block disposed generally along at least a portion of the trailing insert surface;
    wherein the at least one extension block is selectively extendable with respect to the trailing insert surface of the blade insert,
    at least one block screw opening in the blade insert and at least one block screw extending from the at least one extension block and threaded in the at least one block screw opening; and
    at least one guide pin opening in the blade insert and at least one block guide pin extendable from the at least one guide pin opening, and wherein the at least one extension block is carried by the at least one block guide pin.

4. The blade insert extension assembly of claim 3, further comprising at least one tightening screw opening in the blade insert and at least one tightening screw threaded in the at least one tightening screw opening, and wherein the at least one block screw opening and the at least one guide pin opening partially intersect the at least one tightening screw opening.

5. The blade insert extension assembly of claim 1 further comprising at least one side insert surface angling between the leading insert surface and the trailing insert surface of the blade insert.

6. A blade insert extension assembly for an adjustable blade having an insert seat, the adjustable blade suitable for deployment in a blade mount channel of a chipping head and comprising:
    a blade insert confirmed for placement in the insert seat of the adjustable blade the blade insert having a leading insert surface, a trailing insert surface, a planar inner insert surface and a planar outer insert surface;
    an insert extension assembly carried by the blade insert, the insert extension assembly including at least one extension block disposed generally along at least a portion of the trailing insert surface the at least one extension block disposed within a plane of the blade insert, the at least one extension block configured to facilitate lengthwise or planar extension of the blade insert to correspondingly extend the adjustable blade a selected cutting distance beyond the chipping head;
    further comprising at least one side insert surface angling between the leading insert surface and the trailing insert surface of the blade insert; and
    wherein the at least one side insert surface comprises a pair of side insert surfaces angling inwardly from the leading insert surface to the trailing insert surface.

7. The blade insert extension assembly of claim 1 wherein the at least one extension block comprises a plurality of extension blocks.

8. A blade insert extension assembly for an adjustable blade having an insert seat, comprising:

a blade insert configured for placement in the insert seat of the adjustable blade, the blade insert having a leading insert surface and a trailing insert surface; and an insert extension assembly carried by the blade insert, the insert extension assembly including:

at least one extension block disposed generally along at least a portion of the trailing insert surface, the at least one extension block selectively extendable with respect to the trailing insert surface of the blade insert;

at least one block screw opening in the blade insert and opening at the trailing insert surface;

a block screw head cavity in the at least one extension block;

a block screw bead opening communicating with the block screw head cavity;

at least one block screw extending from the at least one extension block and threaded in the at least one block screw opening, the at least one block screw having a block screw head rotatably disposed in the block screw head cavity;

at least one guide pin opening in the blade insert and opening at the trailing insert surface; and at least one block guide pin extending from the at least one extension block and extendable from the at least one guide pin opening.

9. The blade insert extension assembly of claim 8 wherein the at least one guide pin opening comprises a pair of guide pin openings in the blade insert and the at least one block guide pin comprises a pair of block guide pins extending from the at least one extension block and extendable from the pair of guide pin openings, respectively.

10. The blade insert extension assembly of claim 8 further comprising at least one tightening screw opening in the blade insert and at least one tightening screw threaded in the at least one tightening screw opening, and wherein the at least one block screw opening and the at least one guide pin opening partially intersect the at least one tightening screw opening.

11. The blade insert extension assembly of claim 8 further comprising at least one side insert surface angling between the leading insert surface and the trailing insert surface of the blade insert.

12. The blade insert extension assembly of claim 11 wherein the at least one side insert surface comprise a pair of side insert surfaces angling inwardly from the leading insert surface to the trailing insert surface.

13. The blade insert extension assembly of claim 8 further comprising at least one adjusting screw opening in the blade insert and at least one adjusting screw threaded in the at least one adjusting screw opening, respectively.

14. The blade insert extension assembly of claim 8 wherein the at least one extension block comprises a base extension block carried by the blade insert and a terminal extension block carried by the base extension block.

15. The blade insert extension assembly of claim 14 further comprising at least one middle extension block between the base extension block and the terminal extension block.

16. A blade insert extension assembly for an adjustable blade having an insert seat, comprising:

a blade insert configured for placement in the insert seat of the adjustable blade, the blade insert having:

a leading insert surface;

a trailing insert surface;

a pair of side insert surfaces angling from the leading insert surface to the trailing insert surface; and an inner insert surface and an outer insert surface bounded by the leading insert surface, the trailing insert surface and the pair of side insert surfaces; and an insert extension assembly carried by the blade insert, the insert extension assembly including:

a pair of spaced-apart guide pin openings in the blade insert and opening at the trailing insert surface;

a pair of spaced-apart block guide pins extendable from the pair of spaced-apart guide pin openings, respectively, beyond the trailing insert surface;

a base extension block carried by the pair of spaced-apart block guide pins;

at least one middle extension block detachably carried by the base extension block;

a terminal extension block detachably carried by the at least one middle extension block;

a block screw opening in the blade insert and opening at the trailing insert surface; and a block screw carried by the base extension block and threadably engaging the block screw opening.

17. The blade insert extension assembly of claim 16 further comprising at least one tightening screw opening extending through the blade insert from the outer insert surface to the inner insert surface and at least one tightening screw threaded in the at least one tightening screw opening, and wherein one of the pair of spaced-apart guide pin openings and the block screw opening partially intersect the at least one tightening screw opening.

18. The blade insert extension assembly of claim 16 further comprising at least one adjusting screw opening in the blade insert and at least one adjusting screw threaded in the at least one adjusting screw opening, respectively.

19. The blade insert extension assembly of claim 18 wherein the at least one adjusting screw opening comprises a pair of spaced-apart adjusting screw openings in the blade insert and the at least one adjusting screw comprises a pair of spaced-apart adjusting screws threaded in the pair of spaced-apart adjusting screw openings, respectively.

* * * * *